J. Mallory,

Saw Sharpener.

No. 107,270.         Patented Sep. 13, 1870.

John L. Lewis
Charles Ketchum,
Witnesses.

John Mallory, Inventor.

United States Patent Office.

JOHN MALLORY, OF PENN YAN, NEW YORK.

Letters Patent No. 107,270, dated September 13, 1870.

IMPROVEMENT IN SAW-DRESSING MACHINE.

The Schedule referred to in these Letters Patent and making part of the same.

I, JOHN MALLORY, of Penn Yan, in the county of Yates and State of New York, have invented certain Improvements in Saw-dressing Machines, of which the following is a specification.

The first part of my invention relates to the combination of a revolving cutter, made of corundum, with an adjustable frame, provided with wheels to run the cutter, and adjustable stops and springs to cause the cutter to dress a saw in a line or circle.

The second part relates to placing the spindle of the cutter in a circular frame, that may be adjusted so that the cutter will dress a tooth with any angle and bevel necessary for the various kinds of saws or sawing that is to be done.

Figure 1:
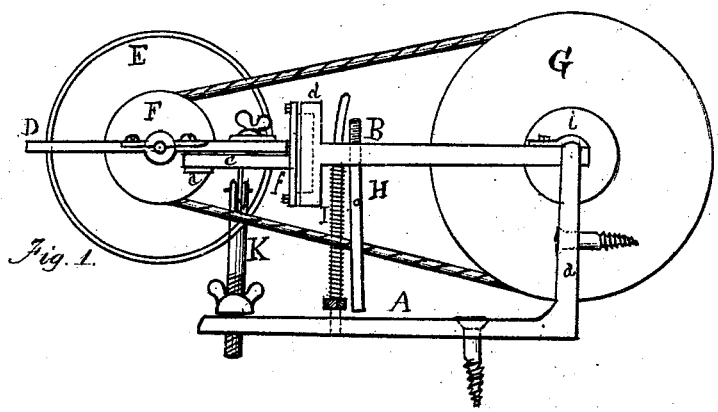
Figure 2:
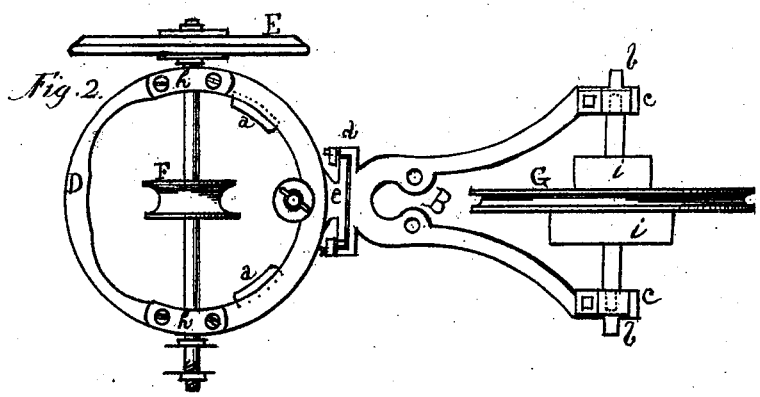

Figure 1 is a top view;
Figure 2, a side elevation; and
Figure 3, a top view of the base of the frame, and one of the supports.

Figure 3:
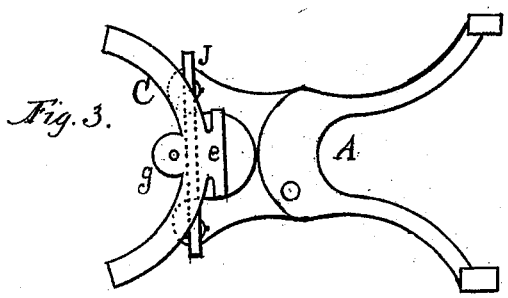

A is the main frame, that supports the other parts. It may be made of cast-iron, and shaped, as shown in fig. 3, with two upright posts, *a*, of sufficient length to hold the frame B. These posts *a* have holes in them for the pivots of the frame B. The posts are made at right angles with the base, with holes through them to fasten them to suitable uprights or posts, and the base has holes for bolts that may be used to fasten it to a table or other horizontal place to which it may be fastened.

B is an adjustable frame that holds the driving-wheels. Its shape is represented in fig. 2.

It is provided with pivots *b* at the outer side and end of each branch.

These pivots are put in the holes in the upper end of the posts *a* of the frame A, and nearly central with these pivots are journal-boxes *c* for the driving-wheel shaft, so that the wheels may be held in the position represented in fig. 1.

At the other end of the frame is a chambered circular plate, *d*, that is made to receive and hold a circular plate, *e*, that is made on the segmental support C, as shown in fig. 1, and a horizontal section is shown in fig. 3..

C is a segmental support for the frame D, that holds the cutter-spindle. Its shape is represented in fig. 3.

It is provided with a circular plate, *e*, that is fitted into the circular plate *d* on the frame B, and is held in place by an annular rim, *f*, that is fastened to the plate *d* on the frame B with screws or bolts, so that it may be held as firmly as desired.

It also has a circular projection, *g*, on the inside of the circle, as shown in fig. 3, for a plate and thumb-screw to hold the spindle-frame D to it, and allow it to be turned sufficient to cut the proper bevel to the saw-tooth. It may be turned by the operator, or be actuated by an inclined bar that is placed underneath it to give it the proper turn to cut the tooth the angle or shape required.

D is the circular frame that holds the spindle of the cutter. Its shape is represented in fig. 2, and its position is shown in fig. 1.

It has a journal-box, *h*, at each side for the spindle, as shown in fig. 2, and it has two clasps, *a'* and *a'*, that are fitted to receive the support C, and hold it directly underneath, and it is held by a plate and thumb-screw to the support C, so that it may be adjusted by the operator to cut the required bevel to the edge of the saw-tooth. This frame may be turned by the operator as much as required, and then may be held by a thumb-screw, so that the cutter will cut all teeth the same bevel.

E is the circular cutter. It may be made any size or thickness required, and of any material that will cut steel saw-blades, and it may be put on either end of the spindle preferred. Besides its rotary cutting motion, it may be moved three other ways: one up and down, to bring it to the saw; one by turning it to the right or left, to cut the required angle, and one circular, by turning the frame, to cause it to cut the teeth the required bevel.

F is a grooved pulley that is fastened on the cutter-spindle, as shown in figs. 1 and 2. The groove should be made larger and deeper than ordinary, so that it will hold a band, when the frame D is turned, sufficiently to cut the required bevel; it is driven by a band from the wheel G, as shown in fig. 1.

G is a grooved band-wheel that drives the cutter-spindle.

It is provided with pulleys, *i*, at each side, of different sizes, as shown in fig. 2, so that its speed may be varied as required. It is driven by a band from any convenient motive power.

H is an adjustable stop. It is made to pass through the frame B, and rest upon the base of the frame A, as shown in fig. 1. It is adjusted by having a screw on the upper end, fitted into the frame, or by a nut above and one below the frame.

I is a support for the frame B, and is made to hold it up, so that the cutter will be above the saw while adjusting it. This support is made of a piece of round iron. The lower end is fastened into the base of the frame A, and has a screw and nut at the lower end, that is used to raise the coiled spring, so that it will raise the cutter the proper height. A coiled spring is put on the round iron, between the nut and under side of the frame B, and the round iron extends up through the frame, as shown in fig. 1. If necessary, more than one may be used.

J is a rectangular bar of iron, placed underneath the frame C, as shown in figs. 1 and 3. Its use is to actuate and stop the frame C; it is held in position by two posts, K, by being pivoted in their upper ends.

K in fig. 1 is a post that holds one end of the bar J. A corresponding post holds the other end. The upper end of each post is branched, and has a pivot through it and the bar. The lower end passes down through the short branch of the base of the frame A, and each post is provided with a nut that may be used to raise or lower them, so that the bar may be adjusted to any angle required.

What I claim as my invention, and desire to secure by Letters Patent, is—

1. The frame B, circular and adjustable support $d$, frame C, adjustable stop H, and support I, with its adjusting-nut and spring, all constructed, arranged, and operating as shown and described.

2. In combination with the frame B, the segmental frame C and circular supporting-frame D, constructed and arranged as shown and described.

3. The bar J and posts K, when made, applied, and used as and for the purpose herein specified.

JOHN MALLORY.

Witnesses:
JOHN L. LEWIS,
CHARLES KETCHUM.